July 17, 1934.  H. E. SLOAN ET AL  1,966,834
CHUCKING MECHANISM
Filed Aug. 5, 1931
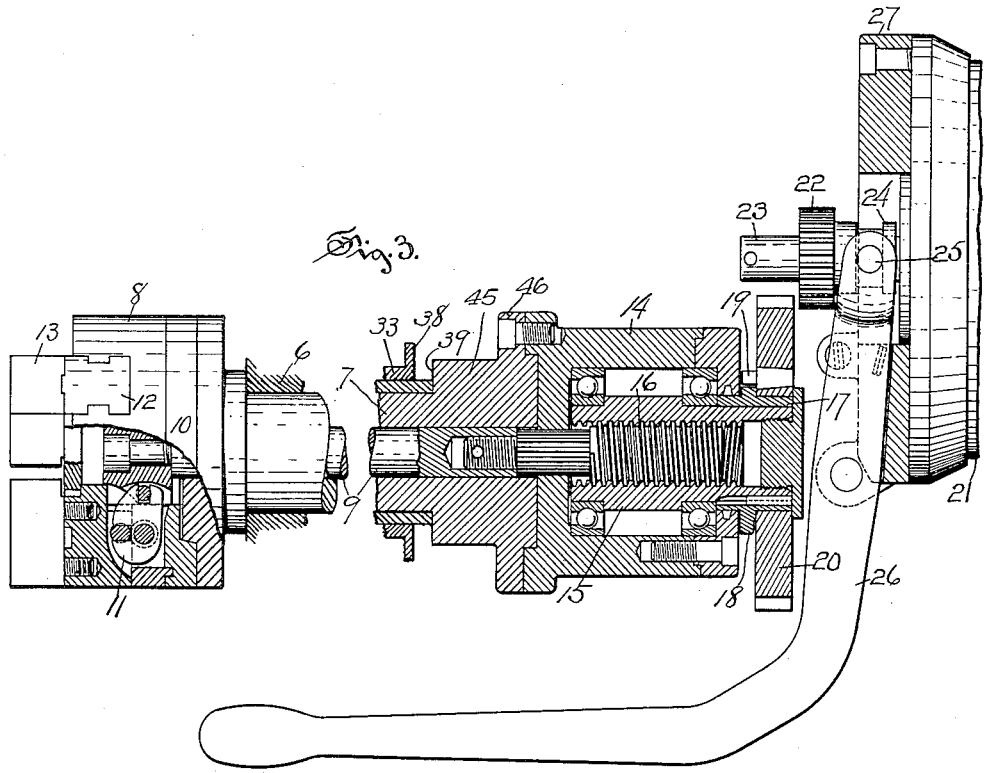
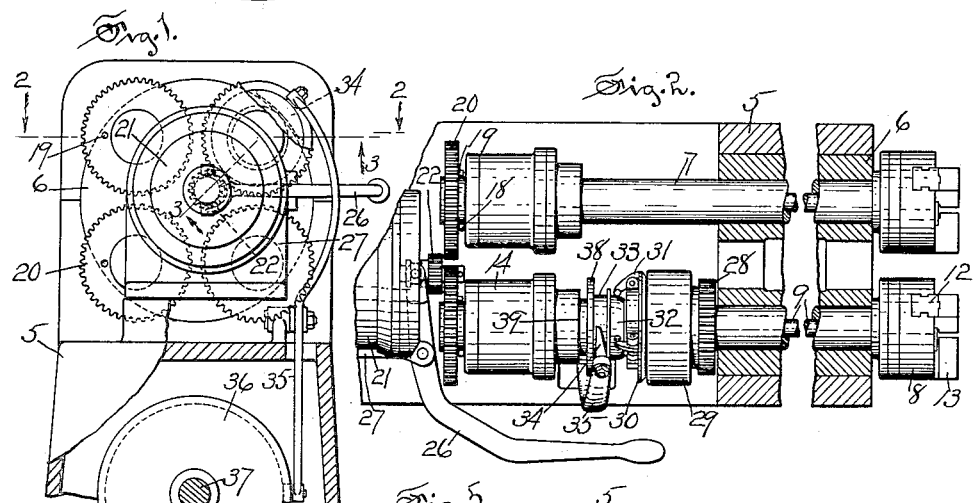
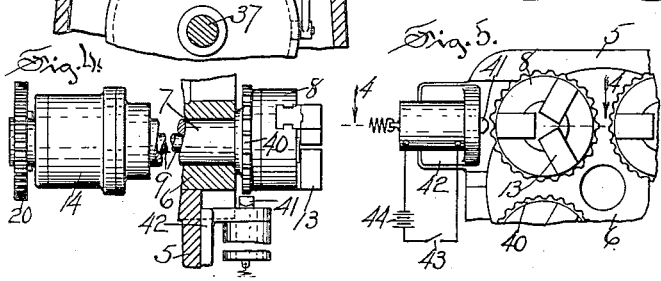
INVENTORS
Harry E. Sloan
George A. Highberg
by
Arthur B. Jenkins
ATTORNEY Patented July 17, 1934

1,966,834

UNITED STATES PATENT OFFICE 1,966,834

CHUCKING MECHANISM

Harry E. Sloan, Hartford, and George A. Highberg, West Hartford, Conn., assignors to The Cushman Chuck Company, Hartford, Conn., a corporation of Connecticut Application August 5, 1931, Serial No. 555,260

9 Claims. (Cl. 29—38)

Our invention relates to mechanism for operating one or more chucks to close and open the jaws thereof to release and secure work for the operation of cutting tools thereon, and an object of the invention, among others, is the production of mechanism of this type that shall be simple in construction and particularly effective in operation.

One form of mechanism embodying our invention, and in the construction and use of which the objects herein set out, as well as others, may be attained, is illustrated in the accompanying drawing in which—

Figure 1 is an end view of a somewhat diagrammatic character illustrating our improved mechanism.

Figure 2 is a view substantially in section on a plane denoted by the dotted line 2—2 of Figure 1.

Figure 3 is a view on enlarged scale in section substantially on a plane denoted by the dotted line 3—3 of Figure 1.

Figure 4 is a detail view illustrating a modified form of the device.

Figure 5 is an end view of some of the spindles illustrating this form of the mechanism.

As hereinbefore noted our improved device operates to close and open the chuck jaws of one or more chucks to secure and release work when such chucks or chuck are or is presented by a carrier in a position for operations of our improved device, the machines in which such device is incorporated also embodying means for operating upon work held by the chuck jaws as the chuck or chucks is or are moved into position by the carrier for operation of a tool or tools comprising a part of the machine as a whole. The chucks may be rotated for the operation of such tools, but as such machines are of old and well known construction as to the chucks and their carriers, which construction and operation will be readily understood by those skilled in the art, only so much of the machine as is necessary for a complete understanding of our invention is illustrated and described herein.

In the accompanying drawing the numeral 5 denotes the frame of the machine, 6 a carrier movably mounted on said frame, and 7 chuck spindles, a plurality of which are shown herein, rotatably mounted in said carrier. A chuck is secured to the outer end of each spindle, each chuck comprising a body 8 into which a chucking spindle 9 projects, said spindle having a chuck jaw actuator 10 secured at its end. Said actuator is engaged with jaw actuating levers 11 pivotally mounted in the chuck body and operatively engaged with jaw carriers 12 supporting chuck jaws 13 mounted for radial movement on the chuck body in a manner that will be readily understood. The description herein will be confined to a single chuck, it being understood that all of the chucks are of similar construction, and such description will apply to each of the chucks and actuating mechanism therefor embodied in the machine.

A housing 14 is secured to the end of the spindle 7 opposite the chuck and an internally threaded sleeve 15 is rotatably mounted on ball bearings in said housing. The spindle 9 has a tip 16 secured thereto, said tip being splined through an opening in the housing and having a threaded end engaging the thread within the sleeve 15, and as shown in Fig. 3 of the drawing. Rotation of the sleeve in opposite directions, as hereinafter described, imparts endwise reciprocating movement to the spindle 9 to open and close the chuck jaws in a manner that will be readily understood from the foregoing description.

The sleeve 15 projects out of the housing 14 and supports on its projecting end a collar 17 which is rigidly secured to the sleeve, said collar having a lug 18 projecting radially therefrom to receive a releasing pin 19 projecting from the side of a chucking gear 20 rotatably mounted, to a limited extent, on the collar 17, and as shown in Fig. 3 of the drawing.

Force applied to the gear 20 to close the jaws against a piece of work sometimes causes the threads between the sleeve 15 and tip 16 to stick, and when force is applied to rotate said gear in the opposite direction to open the jaws the gear rotates freely on the collar until said pin strikes the lug 18, thus imparting a blow that effectually relieves the sticking action referred to.

The structure herein shown readily adapts itself to installation in machines in common use, the device in fact comprising a unit. To this end a head 45 is formed at the end of the spindle, said head in fact constituting an adapter which may or may not be integral with the spindle, but such construction is not essential to the invention. This head has a flange 46 to which the housing, hereinbefore described, is secured and the tip 16 being removably secured to the chucking spindle 9 readily adapts the structure to the attachment to machines heretofore constructed.

A motor 21, preferably of the reversible type, is mounted on the frame of the machine in an operative position with respect to the chuck spindle or spindles when the carrier for such spindle or spindles is in a position of rest, it being here remarked that the operation of the carrier is intermittent, periods of rest being provided to enable work to be performed upon pieces held by the jaws, and also to enable such pieces to be removed from the jaws and other pieces to be replaced therein. A pinion 22 is splined to the motor shaft 23, said pinion having a collar 24 with an annular groove to receive pins 25 projecting from the forks of a hand lever 26 pivotally attached to a motor supporting frame 27 mounted on the frame 5, said hand lever being operated to mesh the pinion 22 with the gear 20 for the purpose of operating the chuck jaws and to disengage said pinion and gear after the chuck jaws have been operated.

In the type of machine shown herein the spindle or spindles 7 and the chuck or chucks supported thereby is or are rotated for operation of the tools on work held by the jaws, such rotation being effected as by means of a gear 28 upon each spindle, when a plurality of spindles are employed, meshing with a continuously driven gear (not herein shown) said gears being constantly in mesh. In order that the spindle may be at rest for the purpose of chucking a clutch is employed, such clutch comprising a drum 29 secured to the gear 28, said gear and drum being free to rotate on the spindle 7 independently thereof. Said clutch also comprises a clutch disc 30 secured to the spindle 7 and operated by clutch levers 31 pivotally attached to the disc and engaged by a clutch operating cone 32 splined to the spindle 7 and including a grooved collar 33.

As the spindle or spindles approaches or approach a chucking position, a shoe 34 is entered, by the movement of the spindle, into the groove in the collar 33, and as shown in Figs. 1 and 2 of the drawing, the carrier coming to rest with the shoe in this position. The shoe is supported at the end of a lever 35 pivotally mounted on the frame 5, the end of the lever opposite the shoe being in contact with a cam 36 secured to a cam shaft 37 relatively timed in its movements to the movements of the carrier for the spindle or spindles, the end of the lever bearing a roller entering a cam groove in the cam as shown in dotted lines in Figure 1 of the drawing.

At the time of operation of a spindle 9 to open or close the chuck jaws it is essential that the spindle 7 be held against rotation, as force applied to the spindle 9 at this time to rotate it will naturally tend to rotate said spindle 7. Mechanism is therefore provided to prevent such rotation at such time, and also to instantly stop rotation of the spindle as it comes to rest in the position just mentioned. This braking and holding mechanism comprises a flange 38 forming one side of the groove in the clutch collar 33, such flange being adapted to contact with a shoulder 39 formed on the head 45 at the end of the spindle 7 back of the housing 14. For reasons of convenience the clutch and brake mechanism just described is shown in connection with one of the spindles only.

As the carrier comes to rest, as just described, with the shoe 34 in the groove in the clutch collar, a rise on the cam 36 operates the lever 35 to release the clutch, such rise being sufficient not only to release the clutch, but also to move the cone to engage the flange 38 with the shoulder 39 and thereby instantly stop rotation of the chuck. The cam is of such formation that the lever 35 will be held in this position long enough to enable a piece of work to be released from and another piece to be placed and secured by the chuck jaws.

When a chuck and its operating mechanism reaches a chucking position the handle 26 is operated to mesh the pinion 22 with the gear 20 and the motor is then started in any suitable manner to rotate the sleeve 15 to open the chuck jaws and to stop such rotation when the jaws have been opened. A new piece of work having been inserted after the old piece is removed, the motor is again operated in a reverse direction to close the jaws upon the new piece of work, any desired means for stopping and starting the motor being employed.

As before mentioned the carrier is intermittently operated, and the periods of rest are generally sufficient to enable a chucking operation to be completed during such interval.

The mechanism shown in Figs. 4 and 5, and embodying our invention, is the same as that hereinbefore described as to the carrier, the spindles mounted thereon and the chucking mechanism. The holder for retaining the chuck spindles from rotation, however, is different and embodies a toothed holding member 40 secured to a chuck spindle, preferably immediately back of the chuck together with a detent 41 mounted on a bracket 42 attached to the frame and adapted to engage said toothed member to hold the chuck from rotation. Said detent may be formed on the end of the core of a solenoid that may be energized in any suitable manner whenever required to hold the chuck against rotation during the chucking operation. As an illustration, a switch 43 is shown diagrammatically herein for controlling electric current from a battery 44.

The operation of this device will be readily understood, it being noted that as soon as the spindle comes to rest in a position for chucking and ceases to rotate the switch 43 will be operated to cause the detent to engage the toothed member 40, thereby holding the chuck spindle 7 against rotation after which the handle 26 is operated to engage and disengage the pinion 22 with and from the gear 20 to begin and end a chucking operation, after which the switch 43 will be again operated to release the member 40 just before the next step in the movement of the carrier to move the chuck to the next position.

An advantage is derived in the use of a manually operated means for connecting the chucking mechanism with the chuck spindle in that the allotted time for enabling a chuck to be relieved and supplied with work is not required to be consumed as would be the case if the pinion 22 and gear 20 were automatically engaged and disengaged.

While the invention has been generally illustrated and described herein as embodied in a spindle or spindles mounted upon a carrier, it is contemplated that such invention may be embodied in a structure comprising a single spindle to which a chuck is secured and which may or may not be mounted on a carrier.

We claim—

1. In combination with a chuck spindle supporting a chuck with chuck jaws movable thereon and including chuck jaw opening and closing mechanism within said chuck, means for driving said spindle, means movable in one direction for disconnecting said driving means from said spindle and in the opposite direction to stop rotation of said spindle upon disconnection of said driving means, a chucking mechanism embodying an actuating member for said operating mechanism, and means for operatively connecting said actuating member with said operating mechanism.

2. In combination with a chuck spindle supporting a chuck with chuck jaws movable thereon and including chuck jaw opening and closing mechanism within said chuck, means for driving said spindle, means movable in one direction for connecting and disconnecting said driving means with and from said spindle and comprising a brake operated by movement in the opposite direction to stop rotation of said spindle upon disconnection from said driving means, a chucking mechanism embodying an actuating member for said operating mechanism, and means for operatively connecting and disconnecting said actuating member with and from said operating mechanism.

3. In combination with a chuck spindle supporting a chuck with chuck jaws movable thereon and including chuck jaw operating mechanism, means for driving said spindle, a clutch for connecting and disconnecting said driving means with and from said spindle, a cone for operating said clutch, a brake formed on said cone member to engage a shoulder on said spindle, means for operating said cone, chucking mechanism embodying an actuating member for said operating mechanism, and means for operatively connecting said actuating member with said operating mechanism.

4. In combination with a rotatably mounted chuck spindle supporting a chuck with chuck jaws movable thereon and including chuck jaw operating mechanism, chucking mechanism embodying an actuating member for said operating mechanism, means for operatively connecting said actuating member with said operating mechanism, a toothed holding member secured to said spindle, and an electrically actuated detent to engage said toothed member to hold it from rotation.

5. In combination with a chuck spindle supporting a chuck with chuck jaws movable thereon and including chuck jaw operating mechanism, the latter embodying a threaded longitudinally movable chucking spindle, a housing in which said spindle projects, a threaded sleeve fitted to the thread of said spindle and projecting out of the end of said housing, a gear secured to the projecting end of said sleeve, a motor with a shaft projecting therefrom substantially parallel with the end of said sleeve, a pinion supported on said shaft, and means for changing the relative positions of said gear and pinion to mesh them one with the other.

6. In combination with a chuck spindle supporting a chuck with chuck jaws movable thereon and including chuck jaws operating mechanism, the latter embodying a threaded longitudinally movable chucking spindle, a housing in which said spindle projects, a threaded sleeve fitted to the thread of said spindle and projecting out of the end of said housing, a gear secured to the projecting end of said sleeve, a motor with a shaft projecting therefrom substantially parallel with the end of said sleeve, a pinion supported on said shaft and shiftable longitudinally thereon, and means for shifting said spindle to mesh it with said gear.

7. In combination with a chuck spindle supporting a chuck with chuck jaws movable thereon, chuck jaw operating mechanism including a housing rigidly attached at the end of said spindle, a chucking spindle projecting into one end of said housing, and having a threaded end, a chucking sleeve rotatably mounted in the housing and engaged with said threaded end and projecting out of the opposite end of said housing, and means extending substantially parallel with the projecting end of said sleeve and operatively connected therewith for rotating said sleeve.

8. In combination with a chuck spindle supporting a chuck with chuck jaws movable thereon, chuck jaw operating mechanism including an adapter rigid with said spindle at the end thereof, a housing removably secured to said adapter, a chucking spindle projecting into one end of said housing and having a threaded end, a chucking sleeve rotatably mounted in the housing and engaged with said threaded end and projecting out of the opposite end of said housing, and means extending substantially parallel with the projecting end of said sleeve and operatively connected therewith for rotating said sleeve.

9. In combination with a chuck spindle supporting a chuck with chuck jaws movable thereon, chuck jaw operating mechanism including a housing rigidly attached at one end of said spindle, a chucking spindle projecting into said housing, a threaded tip splined through the wall of said housing and separately formed from said chucking spindle and attached at the end thereof, a chucking sleeve rotatably mounted in the housing and engaged with said threaded tip, and means for rotating said sleeve.

HARRY E. SLOAN.
GEORGE A. HIGHBERG.